(12) United States Patent
Schmit et al.

(10) Patent No.: US 10,001,221 B2
(45) Date of Patent: Jun. 19, 2018

(54) GAS VALVE WITH RUBBER SEAL PACKING ON THE CLOSING MEMBER

(71) Applicant: Luxembourg Patent Company S.A., Lintgen (LU)

(72) Inventors: Jeannot Schmit, Lintgen (LU); Jean-Claude Schmitz, Heisdorf (LU)

(73) Assignee: Luxembourg Patent Company S.A., Luxembourg (LU)

( * ) Notice: Subject to any disclaimer, the term of this patent is extended or adjusted under 35 U.S.C. 154(b) by 45 days.

(21) Appl. No.: 15/021,749

(22) PCT Filed: Sep. 19, 2014

(86) PCT No.: PCT/EP2014/069973
§ 371 (c)(1),
(2) Date: Mar. 14, 2016

(87) PCT Pub. No.: WO2015/044044
PCT Pub. Date: Apr. 2, 2015

(65) Prior Publication Data
US 2016/0223093 A1    Aug. 4, 2016

(30) Foreign Application Priority Data

Sep. 24, 2013  (LU) .......................................... 92284

(51) Int. Cl.
*F16K 15/06* (2006.01)
*F16K 1/46* (2006.01)

(52) U.S. Cl.
CPC .............. *F16K 15/063* (2013.01); *F16K 1/46* (2013.01)

(58) Field of Classification Search
CPC .................................. F16K 15/063; F16K 1/46

USPC .......................... 137/540; 251/333, 332, 357
See application file for complete search history.

(56) References Cited

U.S. PATENT DOCUMENTS

| 1,346,921 A | * | 7/1920 | Terry | ...................... F16K 17/06 |
| | | | | 137/540 |
| 2,311,009 A | * | 2/1943 | Urquhart | ................... F16K 1/46 |
| | | | | 251/332 |
| 2,414,908 A | | 1/1947 | Smith | |
| 2,448,429 A | | 8/1948 | Henry | |

(Continued)

FOREIGN PATENT DOCUMENTS

| BE | 716804 A | 12/1968 |
| CH | 239079 A | 9/1945 |

(Continued)

OTHER PUBLICATIONS

International Search Report from corresponding International Application No. PCT/EP2014/069973, dated Oct. 30, 2014.

*Primary Examiner* — Kevin Lee
*Assistant Examiner* — P. Macade Nichols
(74) *Attorney, Agent, or Firm* — Sandberg Phoenix & von Gontard P.C.

(57) ABSTRACT

The invention is directed to a closing member of a valve, for example of a gas valve, comprising a body generally circular around a longitudinal axis and with a shoulder, a rubber seal packing disposed around the body on the shoulder and a sleeve disposed around the seal packing and the shoulder. The body comprises a longitudinally extending surface adjacent the shoulder and receiving the seal packing, the surface comprising at least one recess filled by the seal packing.

19 Claims, 1 Drawing Sheet

(56) References Cited

U.S. PATENT DOCUMENTS

| | | | | |
|---|---|---|---|---|
| 3,330,527 A | * | 7/1967 | Nurkiewicz | A62C 13/003 251/114 |
| 4,228,987 A | | 10/1980 | Potter | |
| 4,750,709 A | * | 6/1988 | Kolenc | F16K 41/12 137/556 |
| 8,297,593 B2 | * | 10/2012 | Muzzo | F16K 1/02 251/332 |
| 2010/0001222 A1 | | 1/2010 | Muzzo et al. | |

FOREIGN PATENT DOCUMENTS

| | | |
|---|---|---|
| FR | 2165250 A5 | 8/1973 |
| GB | 875446 | 8/1961 |
| GB | 908919 | 10/1962 |

* cited by examiner

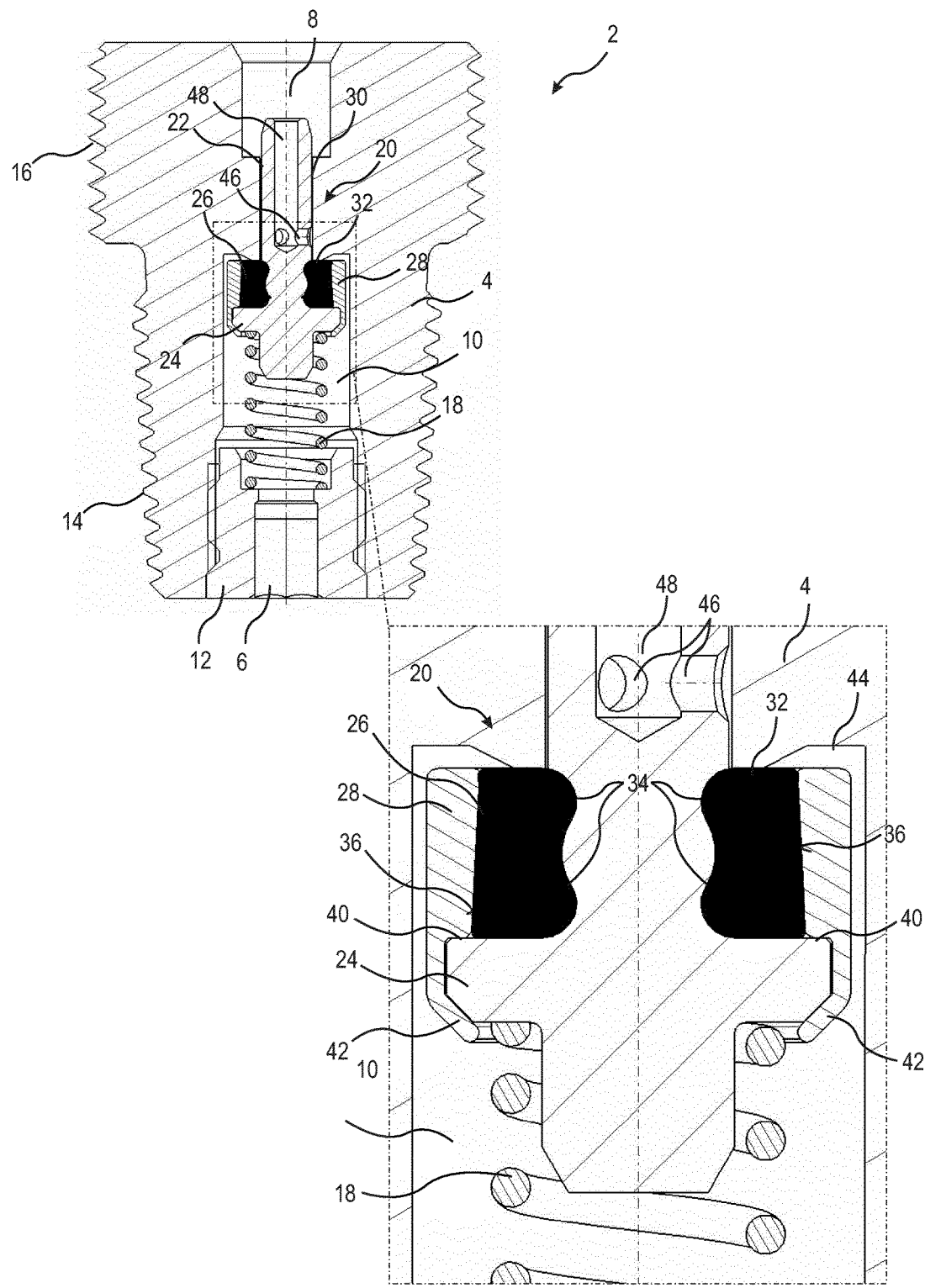

GAS VALVE WITH RUBBER SEAL PACKING ON THE CLOSING MEMBER

CROSS-REFERENCE TO RELATED APPLICATIONS

The present invention is the US national stage under 35 U.S.C. § 371 of International Application No. PCT/EP2014/069973, which was filed on Sep. 19, 2014, and which claims the priority of application LU 92284 filed on Sep. 24, 2013, the content of which (text, drawings and claims) are incorporated here by reference in its entirety.

FIELD

The invention is directed to a closing member of a shut-off valve, among others for gas under pressure, more particularly for gas under high pressure, e.g. above 150 bar. More particularly, the invention is directed to the sealing means on the closure member. The invention is also directed to a valve equipped with the closure member.

BACKGROUND

Prior art patent document published CH 239079 discloses a closing member in the form of a mushroom, i.e. comprising an elongate portion and a shoulder portion around the elongate portion. A rubber seal packing is formed around the elongate portion and on the shoulder portion and is then vulcanised so as to properly adhere to the body of the closing member. The problem of rubber deformation and/or extrusion due to high and/or repetitive loads is neither addressed nor resolved in this teaching.

Prior art patent document published BE 716804 addresses the problem of deterioration of the rubber of a closing member of the type of the preceding document by providing one or several ring shaped slots on the lateral surface of the rubber. This or these slots are intended to reduce the shearing forces exerted by the sharp edge of the shoulder portion of the body of the closing member on the elastomer material. These measures do not however solve the problem of permanent deformation or matting of the rubber at its contact surface with a valve seat.

The prior art patent document published GB 908 919 discloses a valve device of the type of a water cock where the closing member comprises an elongate portion, a shoulder portion and a skirt or sleeve integral with the shoulder and forming an annular cavity receiving an annular elastomeric seal. The seal is surrounded by a sleeve slidable within the cavity. Additionally, the cavity has in its bottom face an annular recess in front of a bevelled corner of the seal so as to allow the elastomeric material to deform and move into the recess thereby increasing its effective resilience. This construction is however essentially directed to manually-operated shut-off valves, i.e. valves where the closing effort is manually exerted by means of a screw mechanism. It is intended to solve the problem of water cocks where the limited resilience of the seal has for effect after having shut-off a hot-water cock that a leakage can occur when the seal cools down. This construction is therefore not adequate for spring biased shut-off valves.

Prior art patent document GB 875 446 discloses a water cock where the closing member comprises an elastomeric seal disposed on a shoulder portion and on which a sleeve is slid and crimped. Both the closing member body and the sleeve have each a ridge from which elastomeric material slightly protrude. The ridges are intended to come into contact with the seat when the valve in shut-off by a manual operation. The limited amount of elastomeric material protruding from the ridges is intended to provide an elastic contact with the seat whereas the ridges are intended to limit this elastic contact. The construction discloses in this document is clearly conceived from manually operated valves like a water cock.

SUMMARY

The invention has for technical problem to provide a spring biased shut-off valve that is able to sustain a high number of opening and closing operations.

The invention is directed to a closing member of a valve, for example of a gas valve, comprising: a body generally circular around a longitudinal axis and with a shoulder; a rubber seal packing disposed around the body on the shoulder; a sleeve disposed around the seal packing and the shoulder; wherein the body comprises a longitudinally extending surface adjacent the shoulder and receiving the seal packing, the surface comprising at least one recess filled by the seal packing.

According to various embodiments, the at least one recess extends circumferentially and has a generally rounded cross-section. In various instances, the longitudinally extending surface the body comprises two such recesses.

According to various embodiments, the closing member is configured so as to allow the sleeve to be slid longitudinally around the seal packing and the shoulder, the internal surface of the sleeve facing the seal packing being bevelled on the shoulder side.

According to various embodiments, the internal surface of the sleeve is bevelled on at least a fifth, for instance a fourth of its length.

According to various embodiments, the internal surface of the sleeve comprises a shoulder portion abutting the shoulder of the body.

According to various embodiments, the sleeve comprises a skirt crimped on the external surface of the shoulder of the body, in various instances the surface is bevelled.

According to various embodiments, the seal packing is fitted on the body.

According to various embodiments, the seal packing comprises a front surface opposed to the shoulder, the front surface being longitudinally aligned with a front surface of the sleeve.

According to various embodiments, the sleeve and the seal packing are configured so as to leave no free space between the sleeve and the seal packing.

According to various embodiments, the body extends longitudinally and the shoulder forms a circular rib around the body.

The invention is also directed to a valve, for example for gas, comprising: a body with an inlet, an outlet and a passage connecting the inlet with the outlet; a valve seat around the passage; a closing member movable in the passage and cooperating with the valve seat; and wherein the closing member is in accordance with the invention.

According to various embodiments, the valve seat and the closing member are arranged such that the seal packing of the closing member cooperating with the seat is positioned upstream of the seat.

According to various embodiments, the valve comprises a spring exerting a biasing force on the closing member in the direction of the valve seat.

According to various embodiments, the spring contacts the closing member on the side of the shoulder that is opposite to the seal packing.

According to various embodiments, the closing member comprises an elongate tubular portion disposed in a portion of the passage, the valve seat being upstream of the portion, on a passage shoulder of a greater diameter than the first portion.

According to various embodiments, the valve seat is longitudinally distant from the surrounding portion of the passage shoulder.

The invention is particularly interesting in that it provides a closing member that is able to sustain a high number of opening and closing cycles without noticeable movement, damage or permanent deformation of the seal packing. The recess(es) is/are indeed able to prevent movement of the seal packing relative to the body of the closing member. The sleeve is also able to prevent movement and/or matting of the seal packing. As a consequence it limits the elastic deformability of the seal packing. The measures of the invention allow a compensation of this undesired phenomenon and facilitate the assembly of the closing member.

DRAWINGS

FIG. 1 illustrates a cross sectional view of a valve comprising a closing member, and a magnified view of the centre portion of the cross sectional view, in accordance with various embodiments of the invention.

DETAILED DESCRIPTION

As can be seen in FIG. 1 a cross sectional view of a valve is provided in accordance with the invention, the valve 2 comprises essentially a body 4 and a closing member 20.

The body 4 comprises an inlet 6, an outlet 8 and a passage 10 connecting the inlet 6 with the outlet 8. In the present example, the inlet 6, the passage 10 and the outlet 8 are all aligned along the longitudinal axis of the valve 2. In other embodiments, this can however be different. The body 4 comprises also on its external surface a conical thread 14 and a parallel thread 16 of a larger diameter. These threads 14 and 16 are intended for mounting the valve in a gas delivery installation, more particularly on a gas cylinder. In other embodiments, these threaded sections can however also be designed differently.

The passage 10 forms a cavity where the closing member 20 is located. The body 4 comprises at the inlet 6 a threaded plug 12 with a through hole forming the inlet 6 as such and serving as a support for a spring 18 exerting a biasing force on the closing member 20.

The closing member 20 comprises an elongate tubular shaped body 22 with a shoulder 24. This shoulder 24 forms a circular rib around the tubular shaped body 22. The closing member 20 comprises also an elastomeric seal packing 26 disposed around the body 22 and on the shoulder 24, more precisely on one side of the circular rib forming the shoulder 24. The elastomeric seal packing 26 is surrounded by a sleeve 28 extending axially around the shoulder 24.

The valve body 4 comprises a valve seat 32 formed on a shoulder section of the passage 10. The valve seat 32 is directed upstream and the closing member 20 is oriented so as to have its seal packing 26 directed to the valve seat 32 so as to be able to shut-off the passage 10. The spring 18 urges the closing member 20 towards the valve seat 32 in the flow direction. In other words, in the absence of external forces or actions on the closing member 20, the force of the spring 18 and the pressure at the inlet 6 tend to shut-off the passage 10.

The tubular body 22 of the closing member 20 extends downstream of the seal packing 26 and the valve seat 32 into a section 30 of the passage 10 that is of a reduced diameter compared to the section upstream of the seal packing 26 and the valve seat 32. A mechanical play or clearance is present between the tubular body 22 and the section 30 of the passage 10 so as to permit a free sliding movement of the closing member 20 as well as a gas flow between the external surface of the tubular body 22 and the internal surface of the section 30. The tubular body 22 comprises a series of holes 46 and a longitudinal and central passage 48 allowing the downstream flow of gas. The internal surface of the section 30 of the passage 10 serves also as a guiding surface for the sliding movements of the closing member body 22.

The external surface of the closing member body 22 comprises one or several recesses 34 at the place where the seal packing 26 is disposed. This or these recesses can present a wavy shape as illustrated in the drawing so as to facilitate the contact with the seal packing 26. In various embodiments, this latter is disposed by a sliding movement along the tubular shaped body 22.

The sleeve 28 comprises an internal surface 36 contacting the seal packing 26. This internal surface 36 can be bevelled or inclined in order to facilitate the axial insertion of the sleeve 28 around the seal packing 26. It can also provide a volume free of material (not represented), i.e. room for elastic flow of the seal material when contacting the valve seat 32. Indeed, it is known that elastomeric materials like rubber are mostly incompressible. In the present case, the fact that this material is surrounded by the sleeve 28 prevents it from plastic deformation and damages due to repetitive opening and closing movements. It also limits its possible deformation. The possible presence of the free space can counterbalance the effect of the protective sleeve 28 on the deformability of the seal packing 26.

The sleeve 28 comprises also a shoulder section 40 abutting the shoulder 24 of the closing member body 22. It comprises also a skirt 42 that is crimped around the shoulder 24, for example on a bevelled surface of the shoulder 24 that is able to retain the sleeve 28.

As can be better seen on the magnified view, the valve seat 32 is axially distant from the surrounding shoulder 44 of the passage 10. In other words, the seat 32 protrudes somehow from the surrounding surface. The surface of this valve seat 32 is also smaller than the front surface of the seal packing 26, thereby allowing the protruding seat 32 to penetrate into the cavity of the sleeve 28 filled with the seal packing 26.

In various embodiments, the front surface of the seal packing 26 is aligned with the corresponding front surface of the sleeve 28 so that the sleeve does not contact the valve body 4 when the closing member shut-off the passage 10 under low pressure working conditions. When applying higher pressures, the sleeve 28 can contact the valve seat 32 to achieve a mechanical stop.

In various embodiments, the valve body 4 is made of metallic material like for example aluminium, brass or stainless steel. The same applies to the closing member 20. This latter can be of a different material than the valve body 4. In various embodiments, the sleeve 28 is also made of metallic material.

The valve 2 that has been described can be used for the delivery of gas under high pressure, i.e. above 150 bars. It can be used in pharmaceutical gas mixtures containing cylinders, more particularly in portable cylinders designed for the delivery of NO/nitrogen mixtures for inhalation purposes, e.g. to prenatal babies.

The invention claimed is:

1. A closing member of a valve, such as a gas valve, said closing member comprising:
   a body generally circular around a longitudinal axis and having a shoulder;
   a rubber seal packing disposed around the body on the shoulder; and
   a sleeve disposed around the seal packing and the shoulder, wherein the body comprises a longitudinally extending surface adjacent the shoulder and receiving the seal packing, the surface comprising at least one recess filled by the seal packing, and wherein the closing member is structured and operable so as to allow the sleeve to be slid longitudinally around the seal packing and the shoulder, and wherein the at least one recess extends circumferentially and has a generally rounded cross-section.

2. The closing member according to claim 1, wherein the internal surface of the sleeve comprises a shoulder portion abutting the shoulder of the body.

3. The closing member according to claim 2, wherein the sleeve comprises a skirt crimped on the external surface of the shoulder of the body.

4. The closing member according to claim 2, wherein the external surface of the shoulder of the body is beveled.

5. The closing member according to claim 1, wherein the seal packing is tightly fit on the body.

6. The closing member according to claim 1, wherein the seal packing comprises a front surface opposed to the shoulder, the front surface being longitudinally aligned with a front surface of the sleeve.

7. The closing member according to claim 1, wherein the sleeve and the seal packing are configured so as to leave no free space between the sleeve and the seal packing.

8. The closing member according to claim 1, wherein the body extends longitudinally and the shoulder forms a circular rib around the body.

9. The closing member according to claim 1, wherein an internal surface of the sleeve, facing the seal packing, is beveled on at least a portion of said surface, said portion being adjacent to the shoulder, so as to facilitate the longitudinal sliding.

10. The closing member according to claim 9, wherein the internal surface of the sleeve is beveled on at least a fifth of a sleeve length.

11. The closing member according to claim 9, wherein the internal surface of the sleeve is beveled on at least a fourth of a sleeve length.

12. A valve, such as a valve for gas, said valve comprising:
   a body with an inlet, an outlet and a passage connecting the inlet with the outlet;
   a valve seat around the passage; and
   a closing member movable in the passage and cooperating with the valve seat, wherein the closing member comprises:
      a body generally circular around a longitudinal axis and having a shoulder;
      a rubber seal packing disposed around the body on the shoulder; and
      a sleeve disposed around the seal packing and the shoulder, wherein the body comprises a longitudinally extending surface adjacent the shoulder and receiving the seal packing, the surface comprising at least one recess filled by the seal packing, and wherein the closing member is structured and operable so as to allow the sleeve to be slid longitudinally around the seal packing and the shoulder, and wherein the at least one recess extends circumferentially and has a generally rounded cross-section.

13. The valve according to claim 12, wherein the valve seat and the closing member are arranged such that the seal packing of the closing member that cooperates with the valve seat is disposed upstream of the valve seat.

14. The valve according to claim 13 further comprising a spring exerting a biasing force on the closing member in the direction of the valve seat.

15. The valve according to claim 14, wherein the spring contacts the closing member on the side of the shoulder that is opposite to the seal packing.

16. The valve according to 12, wherein the closing member comprises an elongate tubular portion disposed in a portion of the passage, the valve seat being upstream of the portion, on a passage shoulder of a greater diameter than the portion.

17. The valve according to claim 16, wherein the valve seat is longitudinally distant from the surrounding portion of the passage shoulder.

18. The valve according to claim 12, wherein an internal surface of the sleeve, facing the seal packing, is beveled on at least a portion of said surface, said portion being adjacent to the shoulder, so as to facilitate the longitudinal sliding.

19. A valve, such as a valve for gas, said valve comprising:
   a body with an inlet, an outlet and a passage connecting the inlet with the outlet;
   a valve seat around the passage; and
   a closing member movable in the passage and cooperating with the valve seat, wherein the closing member comprises:
   a body generally circular around a longitudinal axis and having a shoulder;
   a rubber seal packing disposed around the body on the shoulder; and
   a sleeve disposed around the seal packing and the shoulder, wherein the body comprises a longitudinally extending surface adjacent the shoulder and receiving the seal packing, the surface comprising at least one recess filled by the seal packing, wherein the closing member comprises an elongate tubular portion disposed in a portion of the passage, the valve seat being upstream of the portion, on a passage shoulder of a greater diameter than the portion.

* * * * *